(12) United States Patent
Raman

(10) Patent No.: US 7,369,533 B1
(45) Date of Patent: May 6, 2008

(54) SYSTEM, METHOD AND MOBILE DEVICES TRANSMITTING REQUEST CODES DURING LINK ESTABLISHMENT IN DATA NETWORKS

(75) Inventor: Sundar Raman, Chicago, IL (US)

(73) Assignee: UTStarcom, Inc., Alameda, CA (US)

( * ) Notice: Subject to any disclaimer, the term of this patent is extended or adjusted under 35 U.S.C. 154(b) by 901 days.

(21) Appl. No.: 10/770,614

(22) Filed: Feb. 2, 2004

(51) Int. Cl.
*H04J 3/24* (2006.01)

(52) U.S. Cl. ...................... 370/349; 370/328

(58) Field of Classification Search ............ 370/310.2, 370/328, 338, 349, 465, 466, 467, 471
See application file for complete search history.

(56) References Cited

U.S. PATENT DOCUMENTS

| | | | |
|---|---|---|---|
| 6,463,290 B1 | 10/2002 | Stilp et al. ................. | 455/456 |
| 6,542,515 B1 | 4/2003 | Kumar et al. .............. | 370/463 |
| 6,549,771 B2 | 4/2003 | Chang et al. .............. | 455/419 |
| 6,560,456 B1 | 5/2003 | Lohtia et al. .............. | 455/445 |
| 6,611,516 B1 | 8/2003 | Pirkola et al. ............. | 370/352 |
| 6,891,811 B1 * | 5/2005 | Smith et al. ............... | 370/310 |
| 7,025,209 B2 * | 4/2006 | Hawkins ................... | 209/217 |
| 7,058,633 B1 * | 6/2006 | Gnagy et al. .............. | 707/10 |
| 2002/0038349 A1 * | 3/2002 | Perla et al. ................ | 709/217 |

OTHER PUBLICATIONS

The Point-to-Point Protocol (PPP), W. Simpson, Editor Daydreamer, Jul. 1994, pp. 1-50.
3G TS 24.065, V3.1.0 (Aug. 1990), 3$^{rd}$ Generation Partnership Project, pp. 1-42.
3GPP TS 29.119 V.5.0.0 (Jun. 2002), 3$^{rd}$ Generation Partnership Project, pp. 1-11.
3GPP2 A.S0017-0, Version 1.0, 3$^{rd}$ Generation Partnership Project 2, Nov. 16, 2001, pp. 1-55.

* cited by examiner

*Primary Examiner*—Brenda Pham

(57) ABSTRACT

Data service use on mobile handheld devices requires significant, and sometimes cumbersome user interaction, such as requiring navigation through a series of interactive screen displays, in order to access content the user desires. This invention largely automates the process, and allows a user to access desired content in a more efficient and less time consuming manner, by sending interactive information comprising a code associated with a particular content the user desires to access during the link establishment phase, that is, prior to the completion of the establishment of the point to point link between the user and a network node.

21 Claims, 2 Drawing Sheets

SYSTEM, METHOD AND MOBILE DEVICES TRANSMITTING REQUEST CODES DURING LINK ESTABLISHMENT IN DATA NETWORKS

BACKGROUND OF THE INVENTION

A. Field of the Invention

This invention relates generally to wireless networking and more particularly to a system and method for accessing network information using a wireless device (e.g., cell phone or personal digital assistant) in a quick and efficient manner.

B. Description of Related Art

The providing of data services for mobile devices promises to be an area of expansion in the mobile telecommunications arena in the near and long-term future. With the advent of higher-powered mobile devices, and chipsets for cellular communications that can be integrated into virtually any handheld device, cellular data service adoption has the potential for explosive growth. The present generation of cellular devices such as cell phones and handhelds with cellular communication chipsets allows users to navigate to data service "portals" (typically web sites) via simple key presses on the device keypads or though other simple user interface navigation tools.

Connectivity between the mobile device and the data service portal via a cellular network entails the establishment of a "link-layer" protocol. A link layer is the second protocol layer in the OSI Reference Model, above the physical layer and below the network layer. The link layer is generally concerned with procedures and protocols for operating the communications line connecting two devices and detecting and correcting message errors. In order for a mobile device to connect to the data network, for instance the Internet, for data services, the phone and a network peer (typically a Packet Data Serving Node or PDSN) must communicate via a pre-arranged protocol for transport of datagrams over a communications link.

An example of a link layer protocol is the Point-to-Point Protocol, which used in CDMA-based data networks. The Point-to-Point Protocol, known as the PPP, is described in the IETF Request for Comments 1661 document (W. Simpson, 1994), the content of which is incorporated by reference herein. The PPP allows for a negotiation of Link Control Protocol or "link layer" to be established between the mobile device and its peer on a network. This link layer allows for transport of information (i.e., data packets) using standard data communications protocols, such as Internet Protocol (IP).

Mobile subscribers might use their cellular data service for a variety of purposes, such as obtaining information from their favorite web sites, obtaining stock quotes, checking email, seeking sports scores, or accessing news. The service providers have a goal of presenting a favorable experience to the subscriber. For the most part, the service providers strive to provide for their mobile subscribers an experience as satisfying and as similar to that of a wired connection Internet, to the extent it is possible. The better the subscriber's experience is, the more likely the subscribers are to continue, or expand, their use of cellular data services. This translates to more data traffic, leading to increased revenue for the service provider. Considering that data services can be segmented into multiple tiers of service, and bundled as value-added features, data services are a key source of revenue for all cellular providers.

In the current state of the art, the experience of the average data-services user with a mobile device who wishes to connect to a favorite web site or conduct an Internet search consists of the execution of a number of steps. Consider, for example, a user who wishes to search for sports scores for his favorite team, and for simplicity's sake assume that the subscriber wishes to get the football scores for the Chicago Bears. The steps to be performed are, for instance, as follows:

1. Connection to the data network. This is generally established by pressing an "Internet" key on the handheld device.
2. Upon connection, presentation of a "home page" which reflects the set of standard data "events" or "behaviors" that the service provider allows.
3. Navigation from the "home page" to "Sports" section of the home page.
4. The "Sports" section may have subsections of the different sports that the subscriber is interested in, such as football, basketball, tennis, etc. The subscriber must therefore navigate to the football section.
5. The football section allows the user to either select from a predefined set of teams, or allows for the user to input the team. In response, the user is either navigated to a site with the scores or they are provided with the scores that the subscriber was initially interested in.

As noted above, the experience when using a mobile device to access sports scores involves a multitude of steps. A similar number of steps would be expected to occur to obtain information as to other types of information, such as navigation to a news page with news stories, navigation to page offering local weather forecasts, etc.

Consider now the experience using a "wired" computer connected to a network over a land-based communication medium, such as DSL, PSTN dial-up connection or cable modem:

1. The user knows that they are interested in Chicago Bears scores, and therefore goes to www.chicagobears.com. This navigation could be done by clicking on a link to the website in the "favorites" section in their browser, by clicking on a desktop icon providing a shortcut to the website, or by scrolling down a list previously visited sites and clicking on the URL listed there. In any event, the site is typically only one or two clicks away.
2. The user then navigates or scrolls to the section of the page that provides the scores.

As is apparent, using existing techniques the user experience in a wired environment is much more efficient and satisfactory than in the wireless environment.

This invention provides for a mechanism by which the user may receive a better experience of cellular data services. In particular, the mobile data services user often knows exactly the desired end-point of the data connection, e.g., a particular web site, at the time they initiate connection to the data network. As described in the example above, the user already knows that he wishes to retrieve the Chicago Bears football scores. In accordance with a principal feature of the present invention, information as to the desired network endpoint (e.g., URL or web address, or abbreviation such as "Bears scores") is relayed directly to a network node ("event agent" herein) during the process of link establishment. While the link is in the process of being established, this information is extracted by the event agent, translated as necessary to a standard protocol request message (e.g., HTTP Get Request) and the desired web page or other content is requested. When the link is established, the user is immediately provided with the web page they are looking for, without having to execute multiple navigation steps in order to access the information they are looking for. The user's experience of a mobile data connection is far more favorable that it would otherwise be using prior art approaches.

SUMMARY OF THE INVENTION

In a first aspect, a method is provided for improving the user experience with a mobile device in obtaining content from a destination server. The improvement in the user experience comes from a decrease in the amount of time it takes to obtain the content, and substantially reducing the amount of manual input and navigation steps it takes to obtain the content. Whereas the prior art requires a number of manual steps to navigate to favorite web content, the present invention is essentially one step away, and the information is obtained virtually as soon as the user connects their mobile device to the data network (e.g., Internet).

In accordance with the preferred aspects of this invention, this efficiency and improvement in user experience in achieved by the user providing information in the form of a code (such as a sequence of one or more alpha-numeric characters), referred to herein as a "Magic Key", that is associated with the particular content they wish to access (e.g., Chicago Bears scores) and by submitting this code during the link layer negotiations. An entity in the network, the "event agent" herein, receives this information, correlates or translates it to a particular request for content using a standard protocol (such as a HTTP Get Request), perhaps by reference to a user profile or other table that correlates the code to a particular web content or URL, and then transmits this request to the destination server, all while the link layer negotiations between the mobile device and its peer on the network are proceeding. When the link is established, the response to the request for content (such has the web page that is associated with the content the user wishes to experience) is provided directly to the mobile device. There is no need for time-consuming navigation through various screen displays or through web pages to get to the information the user wants. It is provided automatically and essentially immediately upon completion of the connection.

As an example, the user enters a code into the mobile device memory that is associated with particular content they wish to access. For example, the user may wish to check the score of the Bears game, and enters the code or Magic Key BSCR indicating they wish to access Bears scores. The user then selects a button or takes other action to initiate a connection to the Internet. In response, communications software in the mobile device initiates link layer protocol negotiations with a peer on the network, such as a Packet Data Serving Node. During the link layer negotiations, a message containing the Magic Key is sent from the mobile device to the network and passed to the event agent entity that processes the Magic Keys. This message includes the code, e.g., it includes data in the form MAGIC KEY:=BSCR. This message could be sent in a PPP link control protocol message, for example, in the data field of an LCP-Discard Request packet.

The network entity that processes the request ("event agent" herein) maintains or otherwise accesses a table or database that correlates various magic key codes, such as BSCR, with particular web sites or URLs. This could be done by reference to a user profile if the magic keys are personalized to each user. Alternatively, they could be standardized across all users. This translation or correlation is performed during the link layer negotiations. In a representative embodiment, the event agent correlates the code to a HTTP Get Request to request the web page associated with the Magic Key. The HTTP Get Request is transmitted to a destination server, while the link establishment is being completed. The response (e.g., web page content) is sent directly to the mobile device. The result is that the user may quickly access desired information on a data network as soon as the link is established, without having to navigate through a series web pages to access the information after establishment of the link.

The invention can thus be considered a method for providing a mobile device with content from a destination server, comprising the steps of:

(1) receiving, at a network element, information associated with content that a user of the mobile device wishes to obtain from a network;

(2) translating the information, as necessary, into a request message comprising a request for the content;

(3) transmitting the request message from the network element to the destination server; and (4) transmitting a response to the request message from the destination server to the mobile device;

wherein the information in step (1) is transmitted from the mobile device during a link layer negotiation between the mobile device and a peer on a network whereby the content may be provided to the mobile device in an efficient manner.

In another aspect of this invention, the event agent acts as a proxy for the mobile device and "spoofs" the destination server by inserting the mobile device address in the source address field of the HTTP Get request message. This makes it appear to the destination server that the request message is being sent by the mobile device, when in fact the event agent sends it. In this aspect, apparatus is provided for facilitating the delivery of content from a destination server to a mobile device in an efficient manner, comprising one or more machine-readable storage media storing a set of instructions for execution by one or more processors. The apparatus is referred to herein as an event agent. It will be appreciated by persons skilled in the art that the event agent comprises a logical entity which may physically reside at any suitable network entity, and may be incorporated into other apparatus such as the packet data serving node, cellular data service voice command platform, AAA server, or otherwise. In preferred embodiments the event agent is managed by a provider of cellular data service, and thus can actively manage the table or database correlating Magic Keys to web content, URLs, and/or provide subscribers with new codes for popular web sites or content. The instructions at the event agent include a set of instructions:

(a) for translating information sent by the mobile device during a link layer negotiation into a request message, the information associated with content that a user of the mobile device wishes to obtain from a network;

(b) for relaying said request message to the destination server; and (c) for inserting into a source address field is the request message an address of the mobile device, wherein a response message from the destination server may be sent directly to the mobile device.

Other aspects of this invention pertain to improvements in a mobile communications device, such as mobile phone, personal data assistant, etc. to provide the features of transmitting the code or Magic Key indicating the content they wish to access during the link layer negotiations between the mobile device and a peer on the network. The mobile device includes a processing unit, a memory storing software for operation of the device, and a display for displaying information and one or more user interface devices (buttons, keys, script entry devices etc.) for entering information or selections. The improvement comprises providing in the software instructions for allowing a user to enter a shortcut code (Magic Key) associated with a particular network destination that the user desires to access when connecting the mobile device to a network; and further providing in the software communications instructions wherein the shortcut code is transmitted to an entity in the network during a link layer negotiation. Consequently, the code may be processed by an entity in network (event agent) during the process of conducting the link layer negotiation.

DETAILED DESCRIPTION OF THE PREFERRED EMBODIMENT

Figure 1:
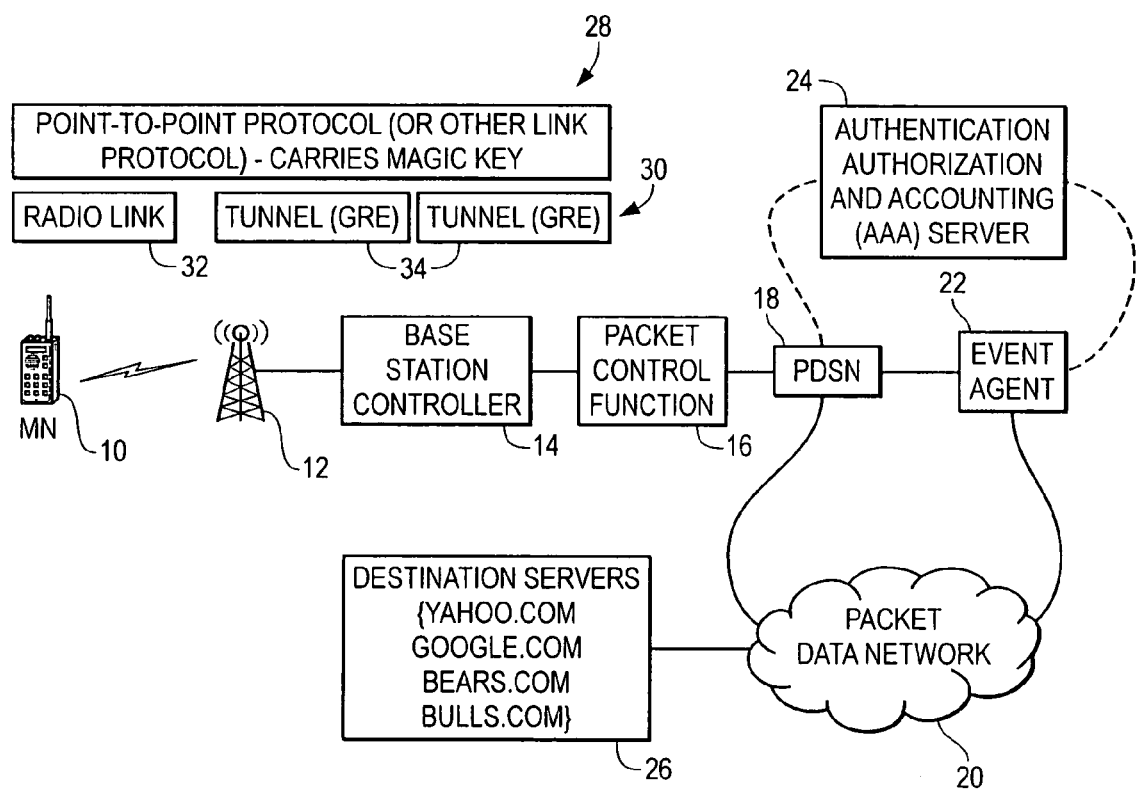
FIG. 1 is a diagram of a representative network environment in which the invention can be practiced.

Most users have the expectation that the mobile data service will provide the fast response that the wired network should. The present-day experience does not answer to that need. This invention provides for a mechanism by which the user may receive a better experience of cellular data services.

Establishing a connection from a mobile device to the data network requires a link layer. The link layer may be via a tunneling protocol, a link protocol, or a combination of the two. Code Division Multiple Access (CDMA) based systems employ the Point-to-Point Protocol (PPP) for the link establishment. GSM Packet Radio Service (GPRS) utilizes the Generic Tunneling Protocol. A variety of other protocols exist, and the different mobile data systems use these protocols for their link layer. In all cases, the link layer must exist in order for a data session to transport packets over the physical layer to occur. The exemplary embodiment will be described in the context of CDMA and PPP, but the invention is applicable to other systems such as GSM and other link layer protocols.

The mobile data services user often knows exactly what the end-point of the data connection is, i.e., the web site they wish to visit. As described in the example above, the user already knows that he wishes to retrieve the Chicago Bears football scores. The user's experience of mobile data connection would be far more favorable if this information of the desired web site could be relayed directly during link establishment, so that once the link is established the web site is immediately displayed for the user, without having to perform a series of navigation steps to access it. Instead of having the user remember and type in the entire URL (Uniform Resource Locator) for the site, the invention contemplates the user only having to enter an abbreviated code (Magic Key), such as short sequence of alpha-numeric characters, which is translated by the network event agent into web site URL by reference to a look-up table and user profile wherein a correlation between Magic Keys for this subscriber to URLs is maintained. The event agent then issues a standard protocol request, for example an HTTP Get request, to the destination server to access this site and the response is sent directly to the mobile device upon the completion of link establishment.

The user's mobile device is preferably augmented with software to provide a feature wherein the user can enter the shortcut code (Magic Key), and software that transmits this code to the network peer during link establishment. The shortcut code is input to the wireless device via key presses on the mobile device. Of course, the Magic Key may be a single character, or a sequence of characters, depending on the user's preferences and convenience. The Magic Key can be mapped back to specific web destinations, for instance the Magic Key 'BSCR' might map to 'Chicago Bears Football Scores' (and www.chicagobears.com) in the user's profile. The Magic Key is entered into the handheld device by the user prior to link establishment. After entering the Magic Key, the user connects to the data network. As an example, the user might press the 'Internet Connect' key on the handheld. Depending on device, and specifications, the connectivity may be established in a variety of different manners. When the mobile device starts negotiations of link establishment, the Magic Key is passed to the network via a link-protocol packet. An example is during link establishment via the Point-to-Point Protocol with CDMA-based mobile devices. The LCP-Discard Request message in PPP is defined as a message that should be discarded without effect on the recipient. The sender may utilize the LCP Discard Request packet for troubleshooting or debugging. This packet can be used to carry the Magic Key in the data field, as described in FIG. 3 below, thereby triggering the appropriate action by the event entity. Other packets, including specially defined packets for carrying the Magic Key, are of course within the scope the invention, the important point being that they are transmitted from the mobile device to the network during the link establishment negotiations.

The "event agent" or recipient of the packet carrying the Magic Key in the specific exemplary case of a CDMA data session, might be the Packet Data Serving Node (PDSN). The PPP link is established between the mobile device and the PDSN. Upon receipt of the LCP-Discard Request message, or other pre-defined carrier message, the PDSN is responsible for lookup of a web site or URL associated with the Magic Key. The lookup may be defined per user, per mobile device, per service tier or hierarchy, or in any other suitable fashion. As an example, the Magic Key in the example case of 'BSCR' might be mapped to the specific subscriber, and the subscriber may have previously defined the trigger for the Magic Key 'BSCR' as the Chicago Bears football scores and www.chicagobears.com. An alternative example is that the service provider provides the standard keymap of 'BSCR' mapping to the Chicago Bears Football Scores. In the event that the Magic Keys are mapped to individual users, the table correlating Magic Keys to particular destinations can be set up by the user interactively using feature codes, or by other methods within the ability of persons skilled in the art.

The trigger functionality by the event agent requires multiple different steps.
1. The Magic Key must be translated to a standard network understandable event (henceforth referred to as the Event Request Message)—possibly after a profile lookup.
2. The Event Request Message must be relayed to the appropriate destination server. One example would be an Event Request Message implemented as an HTTP Get Request, and sent as a query to the Chicago Bears Football Scores site.

3. The Event Request Message will receive a response from the destination server, and the response must be relayed to the mobile device in an appropriate manner. This last step may be implemented in a multitude of manners, depending on the protocol decided upon.

The Event Request Message, its creation and transport, is handled by a logical entity referred to herein as the Event Agent. The Event Agent may be a physically separate or integrated network element. In either case, the functionality is assumed to be logically separate. Interaction with any other network elements that may be defined under the topology of the cellular infrastructure under question may either be by standard or proprietary protocols. In one specific example, the Event Agent might be a physically separate network entity which implements a software function to communicate with, for instance, a Packet Data Serving Node and an Authentication Authorization and Accounting server, via standard protocols such as RADIUS, Diameter and Mobile IP. Naturally, proprietary protocol implementations are valid alternatives.

Since the system envisions a parallelization of activities, the Event Agent, and elements interacting with the Event Agent, play the role of proxy to the handheld device. The proxy functionality is in reproducing the actions that might have been performed by the user in explicit negotiations with the network for the specific requested information. Requests to the data network for specific pieces of information (i.e., the football scores) are performed by the network, and not by the device itself.

For the purposes of this description, the wireless and wired networks are assumed to be separated into the mobile device and the "network elements". The latter comprises all elements of the system that are not the mobile device itself.

The request for information, though originated by the user and the mobile device in the form of the Magic Key, is actually translated by the event agent into a standard protocol request. In other words, the event agent is the source of the information request. In the case of our example, the network element "event agent" is the requestor of the football scores, since the standard protocol message for the query to the destination server originates in the network at the event agent, and not at the mobile device. To this end, the network is responsible for playing the proxy role. This may be implemented in any of several manners, and the following example illustrates one possible implementation.

The Event Agent will translate the messages to the destination server in such a way as to falsely imply (i.e., spoof) that the message originated at the mobile device. This would cause the response message from the destination server to be sent directly to the mobile device. An example with a standard protocol is the case of an HTTP Get Request message from the Event Agent with Transmission Control Protocol/Internet Protocol (TCP/IP) headers indicating that the source address is the mobile device's address, and not the Event Agent's address; and the response message from the HTTP destination server contains a destination address that is the address of the mobile device, and not the address of the Event Agent.

Alternatively, the Event Agent might translate all messages in the manner of a protocol gateway, acting as a translator of messages from one protocol to another. An example implementation might include the following steps:
1. Magic Key is translated to HTTP Request.
2. HTTP Get Request is relayed to destination server.
3. Destination server responds with a HTTP Response to the event agent.
4. HTTP Response is translated to a Short Message Service message and relayed over the Wireless Intelligent Network (WIN) portion of the system to the mobile device.

Obviously, other mechanisms, involving a combination of proprietary and standardized protocols may be utilized to relay the request and response messages between the mobile device and the destination server.

A preferred embodiment will now be described in conjunction with FIGS. 1-3. FIG. 1 is a diagram of a representative network environment in which the invention can be practiced. A mobile device 10 communicates over an air interface with a mobile communications network that includes a base station antenna 12, a base station controller 14 and a packet control function 16 which may be embodied as a mobile switching center. These entities are conventional and well known in the art of cellular communication. The wireless network may take the form of a CDMA network such as is implemented today by some major wireless communication service providers, e.g., Verizon. The wireless network may also take the form of a GPRS (General Packet Radio Service) network, such as implemented by AT&T and Cingular. The packet control function relays packets to a packet data serving node PDSN 18, which functions to interface between the wireless service provider network and the public packet switched network 20. The PDSN 18 is the network peer that negotiates a link control protocol during link layer negotiations between the mobile device 10 and the wireless network. During the link layer negotiations, the link control protocol packet or other message carrying the Magic Key is received at the PDSN 18 and forwarded to the event agent 22. The event agent could be implemented as an entity in the wireless communication network or on the packet data network 20. The event agent 22 and the PDSN 18 are shown in communication with an Authentication, Authorization and Accounting server 24. The AAA server 24 could be used for purposes of authentication of the mobile device 10, storing the user profile for the mobile device 10 (including tables correlating many different Magic Keys with particular content or web sites the user frequently visits). FIG. 1 also shows a destination server 26 that is the recipient of event request messages (HTTP Get Requests), basically the server that is associated with an individual Magic Key. Obviously, for any given user and for any group of users, there will be many different destination servers 26. These servers will be servers hosting particular web sites, such as yahoo.com, Chicagobears.com, msnbc.com, etc., only one of which is shown in FIG. 1 for sake of simplicity and ease of understanding. FIG. 1 also shows the link layer 28 between the mobile device 10 and the PDSN 18. The physical layer below the link layer is shown by the radio link 32 between the mobile device and the base station antenna and the tunnels 34 between the BSC 14 and packet control function 16 and between the packet control function 16 and the PDSN 18.

Figure 2:
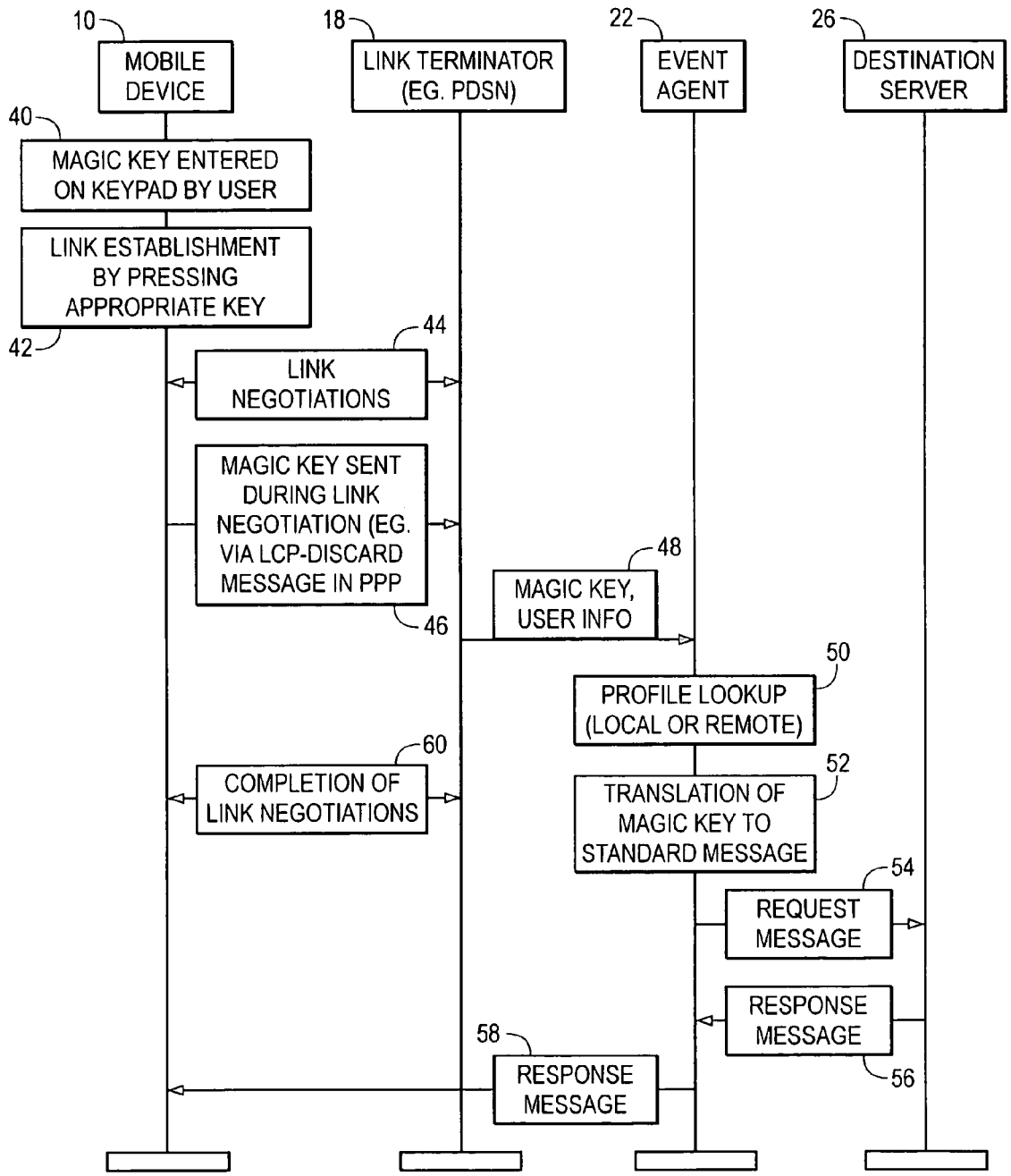
FIG. 2 is a call flow diagram showing a sequence of messages that are exchanged between the network entities of FIG. 1 during the link establishment, showing the transmission of the Magic Key prior to the conclusion of the link establishment negotiation.

FIG. 2 is a call flow diagram showing a sequence of messages that are exchanged between the network entities of FIG. 1 during the link establishment, showing the transmission of the Magic Key to the event agent 22 prior to the conclusion of the link establishment negotiation. At step 40, the user of the mobile device enters a particular Magic Key into the mobile device (e.g., BSCR).

At step 42, the user initiates a connection with the packet data network by pressing the appropriate key or keys, or taking other suitable action. For example, the user could press or activate a key or icon that is associated with "connect to Internet". This action also initiates a link layer negotiation with the mobile device's peer in the wireless network, PDSN 18.

At step 44, the link layer negotiations begin between the mobile device and the PDSN 18.

At step 46, the Magic Key is sent to the PDSN during the link negotiations, e.g., via a LCP Discard Request Message in a PPP link layer negotiation between the mobile device 10 and the PDSN 18.

At step 48, the Magic Key and user information (ID of the user or of the mobile device, IP address of the mobile device, and/or other information) is sent from the PDSN to the event agent 22. While FIG. 1 shows the Event Agent 22 as a separate entity from the PDSN, the event agent functionality could be implemented in the PDSN, in which case the Magic Key and user ID information is passed from one software module to another module implementing the Event Agent in the PDSN.

At step 50, the event agent 22 performs a profile look-up by reference to a database or table that is stored locally, or at a remote entity (such as the AAA server 24 in FIG. 1). The database will contain essentially a cross-reference of users (subscribers), their Magic Keys, and the destination or URL associated with each Magic Key for that user.

At step 52, the event agent 22 translates the Magic Key to a standard event request message, such as an HTTP Get Request for accessing the web site associated with the Magic Key determined from step 50. In an embodiment with spoofing, the source address in this request message is the IP address of the mobile device, not the IP address of the event agent 22.

At step 54, the request message from step 52 is transmitted to the destination server 26.

At step 56, the destination server 56 responds to the request message with a response message 56, which will typically contain web information content.

At step 58, the response message is sent from the event agent to the mobile device.

While steps 46, 48, 50, 52, 54 and 56 are ongoing, the link layer negotiations between the mobile device 10 and the PDSN 18 are also ongoing and are eventually completed as indicated at step 60. The link negotiations would ordinarily be completed prior to the transmission of the response message 58 to the mobile device, and may in fact be completed prior to steps 52, 54 or 56. In any event, shortly after the link negotiations are completed and a channel is established between the mobile device and the PDSN, the response message 58 is received and the user is able to access the web content without any user input after sending the initial Internet connection message at step 42.

FIG. 2 shows a process in which the response message 56 is sent to the event agent 22. The Event agent may then perform any required translation of the response to another protocol, such as HDML, Short Message Service, etc., and then send the response to the mobile device. However, as noted earlier, the request message 54 may substitute the mobile device IP address in the source address of the request message 54, in which case the response message 56 is forwarded directly to the mobile device.

Figure 3:
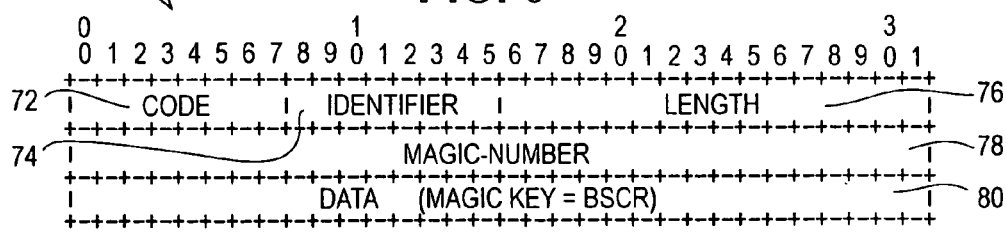
FIG. 3 is a diagram of an LCP-Discard Request packet sent from the mobile device to the event agent during the link layer protocol negotiations, with the data field containing the Magic Key.

FIG. 3 is a diagram of a LCP-Discard Request packet sent 70 from the mobile device to the event agent during the link layer protocol negotiations. The packet includes a code field 72, an identifier field 74, a length field 76, a magic number field 78 and a data field 80. Under RFC 1661, the code field is given a value of 11 (in binary code) to signify that the packet is a Discard-Request packet. This value could be used or a new value defined to indicate that the packet is a magic key carrier packet. The identifier 74 and magic number 78 fields (not to be confused with the Magic Key of this invention) are specified by RFC 1661. The length field 76 indicates the number of bytes that the packet contains. The Data field 80 is used to carry the magic key and identifier data that indicates that that packet contains a magic key. For example, the data in field 80 could take the form MAGICKEY=BSCR (in binary form according to ASCII or extended ASCII code or the equivalent).

In one possible embodiment, the event agent is managed by the provider of the cellular data service. In another possible embodiment, the event agent could be managed and implemented by a third party that is not a provider of wireless data service, such as AOL (America On Line), or some other entity. The wireless service provider would forward all packets with the magic key information during link negotiations to the third party event agent server, which would then translate the magic keys to event request messages and send the request messages to the appropriate destination.

It will further be noted that the format of the event request message is not particularly important and may take a variety of forms depending on the desired content, e.g., streaming media, web page requests, email, etc. The important point is that the information regarding the desired content (media, web page, etc.) is transmitted from the mobile device to the event agent during link layer negotiations, to thereby speed up access to the content and reduce the amount of manual user input, as explained above.

While exemplary and preferred embodiments have been described with particularity, persons skilled in the art will appreciate that variations from the disclosed embodiments to suit particular implementations of the invention may vary without departure from the spirit of the invention. This true scope and spirit is to be ascertained by reference to the appended claims.

I claim:

1. A method for providing a mobile device with content from a destination server, comprising the steps of:
   (1) receiving, at a network element, information associated with content that a user of said mobile device wishes to obtain from a network;
   (2) translating said information, into a request message comprising a request for said content;
   (3) transmitting said request message from said network element to said destination server; and
   (4) transmitting a response to said request message from said destination server to said mobile device;
   wherein said information in step (1) is transmitted from said mobile device prior to completion of a link layer negotiation between said mobile device and a peer on a network.

2. The method of claim 1, wherein steps (1), (2) and (3) are performed during said link layer negotiation.

3. The method of claim 1, wherein said information is provided to said network element in a Link Control Protocol (LCP) packet.

4. The method of claim 3, wherein said link layer negotiation comprises a PPP link establishment negotiation and wherein said LCP packet comprises an LCP-Discard Request packet.

5. The method of claim 4, wherein said information comprises data provided in the data field of said LCP-Discard Request packet.

6. The method of claim 1, wherein said information comprises data obtained from a user operating a user interface on said mobile device prior to the mobile device initiating a connection to said network.

7. The method of claim 1, wherein said information comprises a sequence of one or more alpha-numeric characters.

8. The method of claim 1, further comprising the step of performing a user profile look-up in response to receiving said information.

9. The method of claim 1, wherein said request message to said destination server is sent by said network element and includes a source address field, and wherein said source address field is filled in with an address of said mobile device, and wherein said response to said request message is sent directly from said destination server to said mobile device.

10. The method of claim 1, wherein said information is translated to an HTTP Get Request message by said network element, said HTTP Get Request message is transmitted by said network element to said destination server.

11. The method of claim 1, wherein said network element comprises an event agent comprising a logical entity receiving and translating said information, and wherein said event agent is managed by a cellular data service provider.

12. The method of claim 11, wherein said event agent is embodied in software and integrated with other network element managed by said cellular data service provider.

13. The method of claim 1, wherein said network agent comprises a packet data serving node.

14. The method of claim 1, wherein said network entity comprises an event agent that is managed by an entity that is not a provider of cellular data service.

15. Apparatus for facilitating the delivery of content from a destination server to a mobile device in an efficient manner, comprising:

one or more machine readable storage media storing a set of instructions for execution by one or more processors, said set of instructions comprising instructions:

(a) for translating information, sent by said mobile device prior to completion of a link layer negotiation, into a request message, said information associated with content that a user of said mobile device wishes to obtain from a network;

(b) for relaying said request message to said destination server; and (c) for inserting into a source address field is said request message an address of said mobile device, wherein a response message from said destination server may be directed to said mobile device.

16. The apparatus of claim 15, wherein said instructions are executed by an event agent managed by a provider of cellular data service.

17. The apparatus of claim 15, wherein said instructions are executed in a packet data serving node.

18. The apparatus of claim 15, wherein said link layer negotiation comprises a PPP link establishment negotiation and wherein said information is contained in a LCP-Discard Request packet.

19. The apparatus of claim 15, wherein said information comprises data obtained from a user operating a user interface on said mobile device prior to initiating a connection to said network.

20. The apparatus of claim 15, wherein said information comprises a sequence of one or more alpha-numeric characters and wherein said alpha-numeric characters are translated into a network address associated with said content.

21. The apparatus of claim 15, wherein said instructions are executed by an event agent that is managed by an entity that is not a provider of cellular data service.

* * * * *